(12) United States Patent
Mangerson (10) Patent No.: US 6,252,570 B1
(45) Date of Patent: Jun. 26, 2001

(54) POLARIZED THREE-DEMENSIONAL VIDEO DISPLAY (75) Inventor: Mark M. Mangerson, LeMars, IA (US)

(73) Assignee: Gateway, Inc., North Sioux, SD (US)

( * ) Notice: Subject to any disclaimer, the term of this patent is extended or adjusted under 35 U.S.C. 154(b) by 0 days.

(21) Appl. No.: 08/810,143

(22) Filed: Feb. 25, 1997

(51) Int. Cl.[7] .................................................. G09G 3/36
(52) U.S. Cl. ................................ 345/87; 345/7; 345/8; 349/17
(58) Field of Search ............................ 348/4, 36, 5–57; 345/7, 8, 10, 51, 52, 53, 54, 55, 57–58, 87; 349/11, 13, 17, 93, 96–103

(56) References Cited

U.S. PATENT DOCUMENTS

| 4,281,341 | * | 7/1981 | Byatt | 358/92 |
| 5,537,144 | * | 7/1996 | Faris | 348/58 |
| 5,694,164 | * | 12/1997 | Choi | 348/57 |
| 5,751,388 | * | 5/1998 | Larson | 349/96 |
| 5,822,117 | * | 10/1998 | Kleingerger et al. | 359/465 |
| 5,828,362 | * | 10/1998 | Takahashi | 345/153 |

* cited by examiner

Primary Examiner—Bipin Shalwala
Assistant Examiner—Mansour M. Said
(74) Attorney, Agent, or Firm—Schwegman, Lundberg, Woessner & Kluth, P.A.; Kenneth J. Cool (57) ABSTRACT

A display system, display device and add-on for a display device are disclosed to provide for viewing a three-dimensional image using polarization. The image is separated into first eye and second eye components. In one embodiment, a system comprises a computer-driven display device and a pair of viewing glasses. The display device is adapted to display the first eye and second eye components in alternating refreshes of the display device, the alternating refreshes polarized substantially perpendicular to one another. The pair of viewing glasses has two lenses. Each lens is polarized substantially particular on one another, in accordance with the alternating refreshes.

7 Claims, 6 Drawing Sheets

POLARIZED THREE-DEMENSIONAL VIDEO DISPLAY

FIELD OF THE INVENTION

This invention relates generally to displaying a three-dimensional image on a display device of a computer, and more particularly to displaying such images using polarization.

BACKGROUND OF THE INVENTION

With the advent of faster computers has come the increasing use of such computers to display three-dimensional images on display devices attached thereto. Computer applications that display three-dimensional images include modeling simulations, graphs and charts of financial data, and games. However, a drawback to the computerized display of three-dimensional images is that the display devices typically attached to computers are inherently two-dimensional-oriented devices. Therefore, the three-dimensional images do not appear in three dimensions when displayed on the display device.

To overcome this inherent deficiency, several solutions within the prior art have been proposed. One solution is the use of a special monitor worn like glasses on the head of a computer user. The monitor actually includes two separate display devices, one for each eye. Each eye therefore sees a different image, such that together the images form a complete stereo view of a three-dimensional image. This solution is expensive, however. Furthermore, if more than one user needs to view the three-dimensional image at the same time, each user needs to have his or her own pair of monitor glasses.

Another solution is the use of special glasses in conjunction with the display device already attached to the computer. This special pair of glasses includes electronically operated shutter lenses. When left-eye information is shown on the screen, the computer signals the glasses to close the right-eye shutter, and vice-versa. This active approach to viewing three-dimensional computer images is also expensive, and also has the disadvantage of making everything else in the room in which the user is viewing the image to appear in strobe effect.

Both of the prior art solutions described involve the use of active and expensive circuitry worn on the head of the computer user. In the former solution, the user actually wears a computer monitor. In the latter solution, the user wears a pair of glasses that actively opens and closes the left and right shutters. There is a need, therefore, for a passive, inexpensive manner in which to view three-dimensional computer images that does not involve expensive and complex circuitry worn by a user.

SUMMARY OF THE INVENTION

This invention relates to the displaying of computerized three-dimensional images on a display device using polarization. In a first embodiment of the invention, a system for viewing a three-dimensional image divided into first eye and second eye (e.g., left-eye and right-eye, or right-eye and left-eye) components comprises a display device and a pair of viewing glasses. The display device is adapted to display the first eye and second eye components in alternating refreshes of the display device. The alternating refreshes are polarized substantially perpendicular to one another. The pair of viewing glasses has two lenses, each polarized substantially perpendicular with the other, and in accordance with one of the alternating refreshes. The system is operable in both a two-dimensional and a three-dimensional viewing mode.

In this manner, the present invention provides for the display of three-dimensional images in apparent three dimensions. A display device of a computer is typically refreshed sixty times a second. Thus, thirty times a second the display device shows the first eye component of the image, and the other thirty times a second the display device shows the second eye component. Because the display device polarizes the alternating refreshes perpendicular to one another, and the pair of viewing glasses has lenses accordingly polarized, each eye of the user only sees one component of the image. The image, therefore, is shown in apparent three dimensions.

Other embodiments include specific display devices and add-on devices for ordinary display devices to provide for the display of three-dimensional images using polarization. Still other and further aspects, advantages and embodiments of the present invention will become apparent in the following description and by reference to the accompanying drawings.

DETAILED DESCRIPTION OF THE INVENTION

Figure 1:
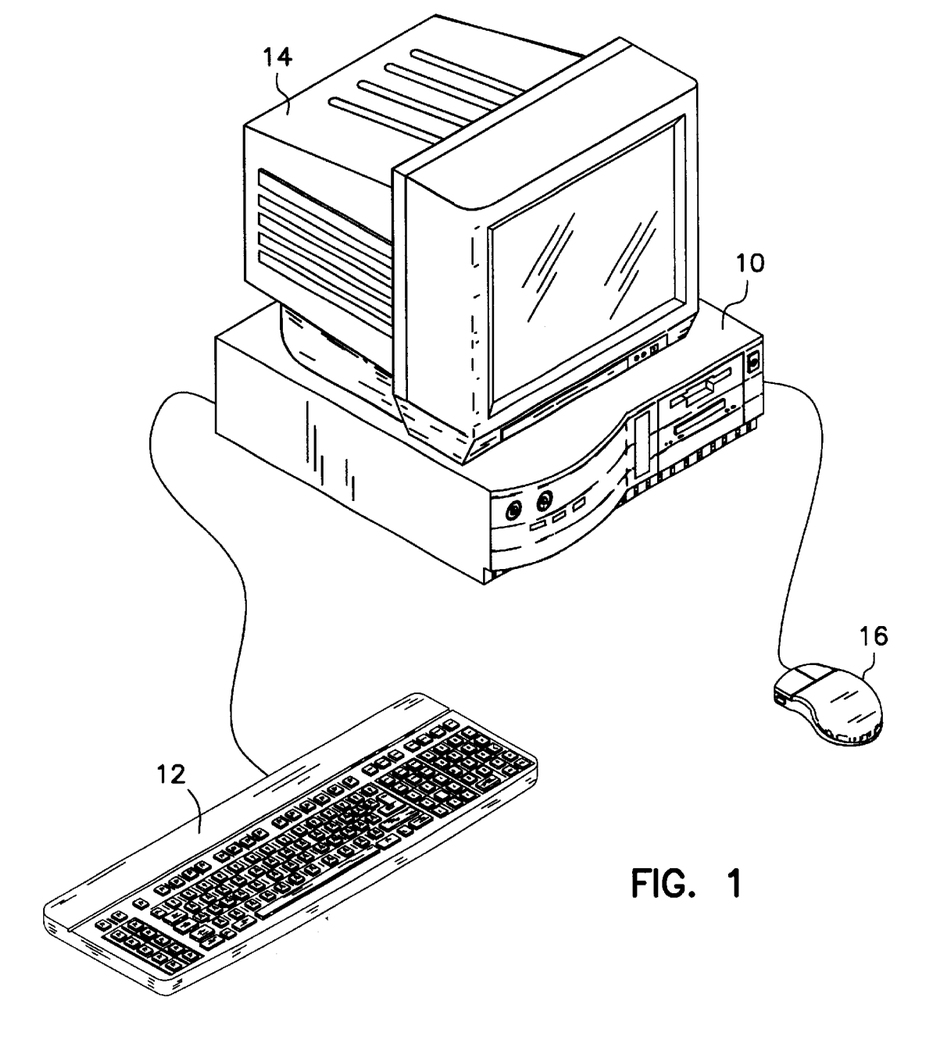
FIG. 1 is a diagram of a typical computer in conjunction with which the present invention may be used.

The present invention provides for the display of a three-dimensional image on a display device of a computer using polarization. A diagram of a typical computer in conjunction with which the present invention can be used is shown in FIG. 1. Computer 10 usually includes keyboard 12, display device 14 and pointing device 16. Not shown is that computer 10 typically also comprises a random-access memory (RAM), a central-processing unit (CPU), and one or more storage devices, such as a hard disk drive, a floppy disk drive, or a tape cartridge drive, although the invention is not so limited. As shown, computer 10 is a desktop computer, such as a Gateway 2000 personal computer, although the invention is not so limited. For example, computer 10 could also be a laptop computer such as a Gateway 2000 Solo laptop computer.

Computer 10 typically has a program running thereon that provides for movement of a cursor on display device 14 in response to the user operating pointing device 16. One such program is Microsoft Windows 95. Display device 14 can be any of a number of different devices, such as a computer monitor employing a cathode ray tube (CRT), a field-emission display (FED), or a liquid crystal display (LCD). Pointing device 16 as shown is a mouse, although the invention is not so limited. For example, pointing device 16 may also be a trackball, or a touch pad.

Figure 2:
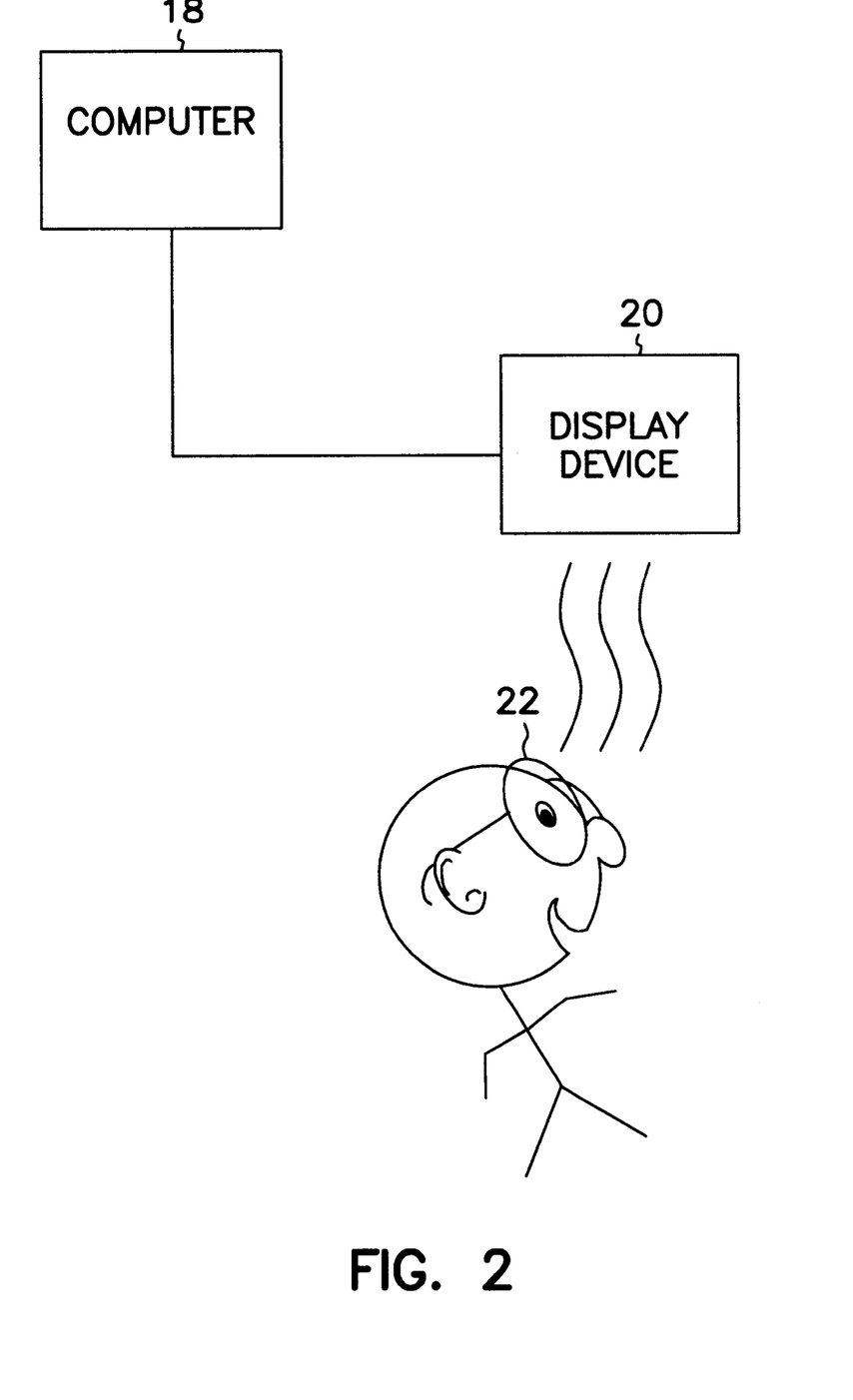
FIG. 2 is a block diagram illustrating an embodiment of the present invention.

Referring now to FIG. 2, a block diagram illustrating one embodiment of the invention is shown. Display device 20 is driven by computer 18 and is viewed by a user wearing pair of glasses 22. Both computer 18 and display device 20 correspond to their counterparts of FIG. 1. Computer 18 separates a particular three-dimensional image into two components, a left-eye component and a right-eye component. The left-eye component is for viewing by only the left eye of the user, while the right-eye component is for viewing by only the user's right eye. This permits the user to view the image in apparent three dimensions, as will be appreciated by those skilled in the art. That is, the two components, when viewed by their respective eyes, form a complete stereoscopic three-dimensional view of the image.

Display device 20 is refreshed a predetermined number of times per second. In one embodiment, display device 20 is refreshed sixty times per second. Refreshing is necessary for display devices because typically the image almost immediately begins to fade from the display device after it has been displayed on the device. Therefore, refreshing the display device permits the image displayed thereon to achieve a certain degree of permanence. Furthermore, refreshing the display device so frequently provides for the illusion of movement or animation of an image. A single refresh refers to one of the predetermined number of times per second that the display device is refreshed. That is, a single refresh is a single frame of the sixty frames per second that are displayed on the screen.

Display device 20 displays different components of the three-dimensional image in alternating refreshes. In one embodiment of the invention, the left-eye component is displayed in odd-numbered refreshes (e.g., 1, 3, 5, 7 . . . 59), and the right-eye component is displayed in even-numbered refreshes (e.g., 2, 4, 6, 8 . . . 60). Thus, in one refresh or frame the left-eye component is displayed, while in the next refresh or frame the right-eye component is displayed, while in the still next refresh or frame the left-eye component is displayed, et seq. Computer 18 in one embodiment includes a graphics card with dual frame buffers so that the left-eye component of the image may be stored in one frame buffer, while the right-eye component of the image may be stored in the other frame buffer.

Figure 3A:
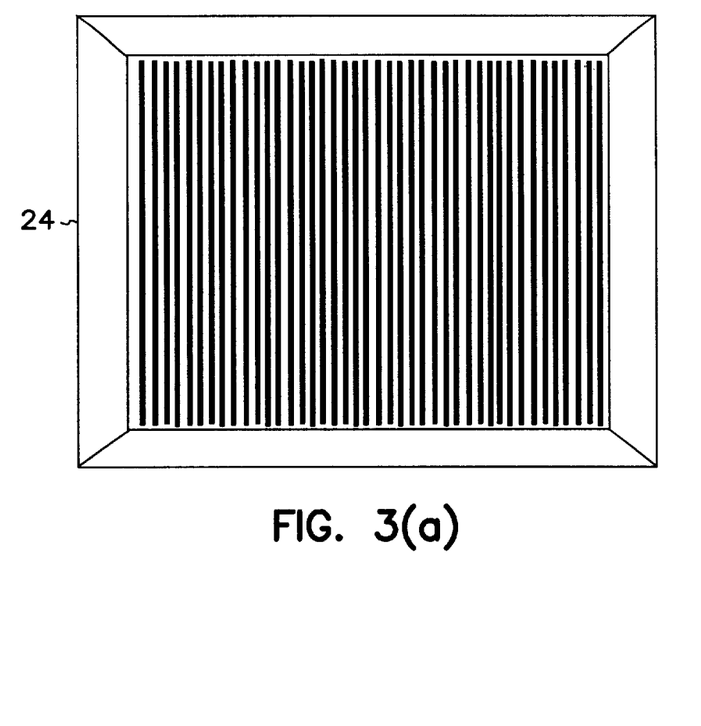
FIG. 3(a) is a diagram showing a typical polarization pattern for one of the alternating refreshes, in accordance with the present invention.
Figure 3B:
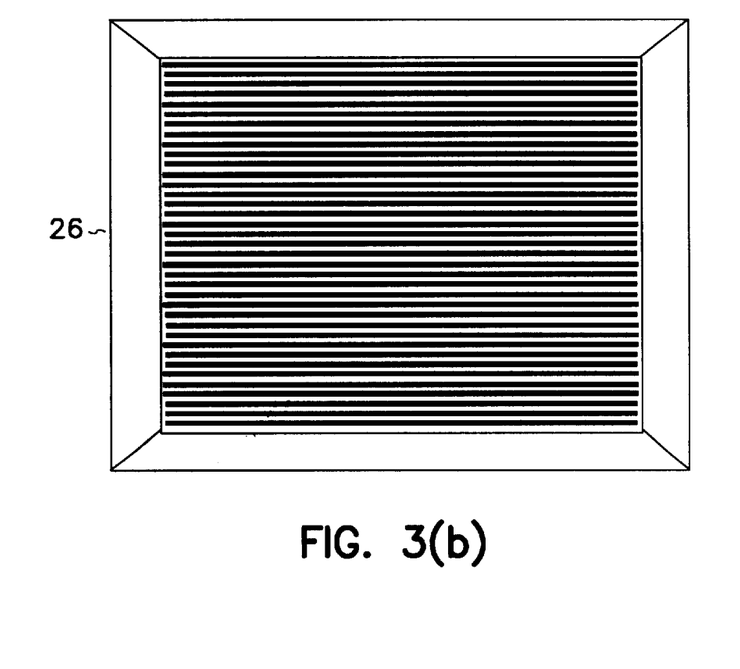
FIG. 3(b) is a diagram showing a typical polarization pattern for the other of the alternating refreshes, in accordance with the present invention.

Display device 20 also displays the alternating refreshes in polarizations substantially perpendicular to each other. Thus, in one embodiment of the invention, the left-eye component is displayed in odd-numbered refreshes that are polarized vertically, and the right-eye component is displayed in even-numbered refreshes that are polarized horizontally. This is shown in FIG. 3(a) and FIG. 3(b), which are typical polarization patterns for alternating refreshes. Polarization pattern 24 of FIG. 3(a) is vertical, and is substantially perpendicular to polarization pattern 26 of FIG. 3(b), which is horizontal. Thus, in one embodiment the left-eye and right-eye components are displayed in alternating refreshes having polarizations of FIG. 3(a) and FIG. 3(b), respectively.

Figure 4:
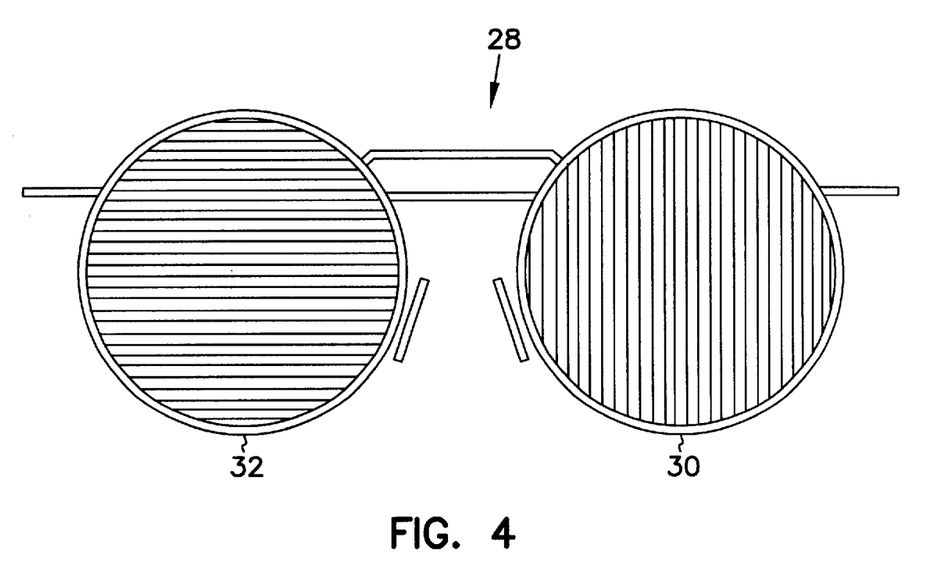
FIG. 4 is a diagram of viewing glasses in conjunction with which the present invention may be used.

Referring back to FIG. 2, glasses 22 have polarized lenses such that each lens only allows for viewing of one of the components. The left lens is polarized with the same orientation as are the refreshes in which the left-eye component is displayed, and the right lens is polarized with the same orientation as are the refreshes in which the right-eye component is displayed. This is shown in FIG. 4, which is a diagram showing in more detail viewing glasses in accordance with the invention. Glasses 28 correspond to glasses 22, and has left lens 30 and right lens 32. As shown, left lens 30 has a vertical polarization, corresponding to polarization pattern 24 of FIG. 3(a), while right lens 32 has a horizontal polarization, corresponding to polarization pattern 26 of FIG. 3(b).

The invention provides for the viewing of an image in apparent three dimensions because the polarized lenses of the viewing glasses only permit light of the same polarization to be let through. For example, as has been described, in one embodiment of the invention the left-eye component of the image is displayed in odd-numbered refreshes having a vertical polarization, and the right-eye component is displayed during even-numbered refreshes having a horizontal polarization. During the odd-numbered refreshes, only the left lens of the viewing glasses, which also has a vertical polarization, permits viewing of the left-eye component by the left eye of the user. During these odd-numbered refreshes, the right lens of the glasses, which has a horizontal polarization, does not permit viewing of the left-eye component by the right eye of the user. This is because the right lens has a polarization substantially perpendicular to that of the refreshes in which the left-eye component of the image is displayed. The left lens, however, has the same polarization of these refreshes, and therefore permits the left-eye component to be viewed by the left eye.

Similarly, in one embodiment of the invention, during the even-numbered refreshes only the right lens of the viewing glasses permits viewing of the right-eye component by the right eye of the user. The right lens has the same polarization as that of the even-numbered refreshes in which the right-eye component is displayed by the display device. The left lens has a substantially perpendicular component, and therefore does not permit viewing of the right-eye component by the left eye of the user.

Because the refreshes occur so frequently—in one embodiment, sixty times per second—the eyes of the user are tricked into believing that the image being viewed exists in three dimensions. That is, as understood by those skilled in the art, presenting a different aspect of the image to each of the two eyes of the user provides for viewing of the image in apparent three dimensions. The refreshes of the display device occur frequently enough that in effect both the left-eye and right-eye components of the image are displayed to the user at the same time (e.g., thirty times per second for each component). The viewing glasses are polarized so that only the left eye sees the left-eye component, and only the right eye sees the right-eye component.

As has been described, the present invention provides for a number of advantages in its display of an image in apparent three dimensions. First, the viewing glasses are passive, having only lens polarized substantially perpendicular to one another in order to operate. No active mechanisms, such as moving shutters, are required to ensure that the left eye of the user does not see right-eye information, as vice versa. Furthermore, this means that the user does not see everything else in the room in strobe effect. Second, the system is relatively inexpensive. The viewing glasses do not require the inclusion of any expensive electronic circuitry in order to operate. Furthermore, if multiple users of the computer wish to concurrently view the image in three dimensions, each only has to have a pair of the viewing glasses in order to do so. No other modifications or additions are necessary.

Figure 5:
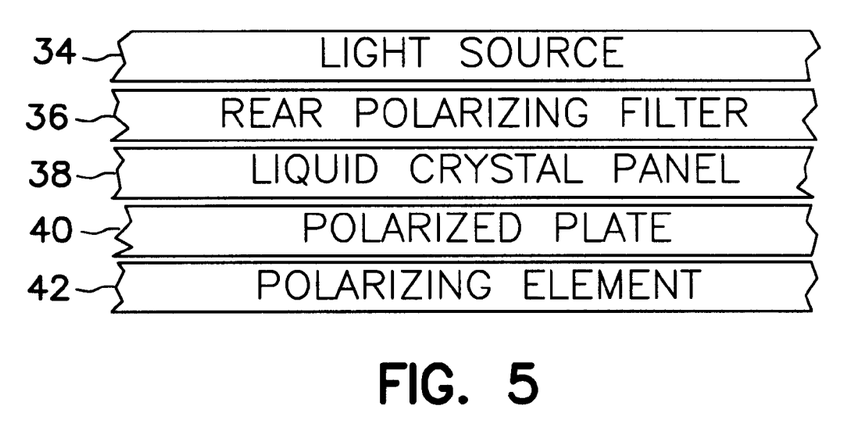
FIG. 5 is a cross-sectional view showing an embodiment of the present invention utilizing a liquid crystal display (LCD)

Referring now to FIG. 5, a cross-sectional view of one particular embodiment of the invention utilizing liquid crystal display (LCD) technology is shown. The display device shown has light source 34, rear polarizing filter 36 positioned over light source 34, liquid crystal panel 38 positioned over rear polarizing filter 36, polarized plate 40 positioned over liquid crystal panel 38, and polarizing element 42 positioned over polarized plate 40. Light source 34 in one embodiment is a back light such as a cold cathode fluorescent tube combined with a light pipe. Light emanates from light source 34 and spreads out in waves that vibrate in all direction. Rear polarizing filter 36 is a polarizing filter and in one embodiment is made from glass. Rear polarizing filter 36 lets through only the light waves that are vibrating more or less in one particular direction (e.g., horizontally).

Liquid crystal panel 38 twists the polarized light coming through rear polarizing filter 36 from zero to ninety degrees. In one embodiment, liquid crystal panel 38 is an active matrix liquid crystal panel, while in another embodiment it is a passive matrix liquid crystal panel. The light is twisted color component by color component for each pixel (e.g., red, green and blue), depending on the desired color for a particular pixel. Polarized plate 40 is a polarizing filter that in one embodiment is also made from glass. Polarized plate 40 has a polarization substantially perpendicular to that of rear polarizing filter 36. Polarized plate 40 thus lets the beams of light through that have been twisted by panel 38 that are vibrating more or less in one particular direction (e.g., vertically).

Finally, polarizing element 42 further twists the light twisted by panel 38 and polarized by plate 40. Polarizing element 42 is in one embodiment of the invention a liquid crystal panel. Polarizing element 42 twists the light ninety degrees in alternating refreshes of the display device. For example, in one embodiment of the present invention, polarizing element 42 does not twist the light at all during odd-numbered refreshes, and twists the light ninety degrees during even-numbered refreshes. In other words, alternating refreshes are twisted perpendicularly to one another. That is, in effect, alternating refreshes are polarized substantially perpendicular to one another.

Thus, the embodiment of the invention shown in FIG. 5 works as follows. In one case, polarized plate 40 is polarized vertically, and polarizing element 42 twists the light ninety degrees in even-numbered refreshes. Thus, odd-numbered refreshes of the display device are polarized vertically. They are not twisted by polarizing element 42. Conversely, even-numbered refreshes are polarized horizontally, because they are twisted ninety degrees by polarizing element 42. Since the left-eye component of an image is shown only in odd-numbered refreshes and the right-eye component is shown only in even-numbered refreshes, the user of the computer views the image in apparent three dimensions using viewing glasses having a left lens vertically polarized and a right lens horizontally polarized.

The display device shown in and described in conjunction with FIG. 5 is a complete display device embodying the present invention and to which a computer can be operatively coupled. In another embodiment of the present invention, an add-on device is removably mounted to an already existing display device to form a display system for the viewing of three-dimensional images using polarization. This is shown in FIG. 6, which is a cross-sectional view of an embodiment using an ordinary display device.

Figure 6:
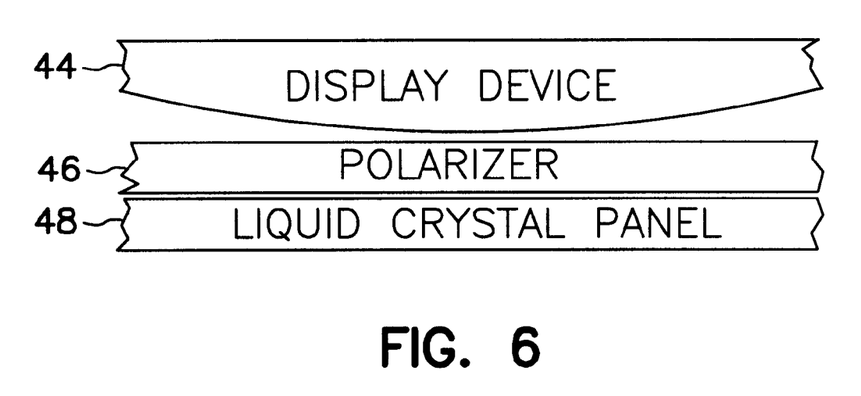
FIG. 6 is a cross-sectional view showing an embodiment of the present invention utilizing an ordinary display device; and, FIG. 7 is a diagram showing an embodiment of the present invention utilizing an add-on device in conjunction with a typical display device of a computer.

Referring now to FIG. 6, display device 44 is a typical, ordinary display device as commonly available, such as a cathode-ray tube (CRT) or a field-emission display (FED), either of which include a screen. Light emanating from display device 44 is not polarized. Polarized plate 46 is positioned over the screen of display device 44, and liquid crystal panel 48 is positioned over polarized plate 46. Polarized plate 46 and liquid crystal panel 48 make up a polarizing component, positioned over the screen of the display, to polarize alternating refreshes of the display device substantially perpendicular to one another. This polarizing element in one embodiment is encased within an add-on device removably mounted to the display device, although it can also be encased within the housing of the display device as well.

Specifically, polarized plate 46 is a polarizing filter and in one embodiment is made from glass. Polarized plate 46 lets through only the light waves that are vibrating more or less in one particular direction (e.g., vertically). Liquid crystal panel 48 twists the light waves polarized by plate 46. Panel 48 twists the light ninety degrees in alternating refreshes of the display device. For example, in one embodiment of the present invention, polarizing element 48 does not twist the light at all during odd-numbered refreshes, and twists the light ninety degrees during even-numbered refreshes. In other words, alternating refreshes are twisted perpendicularly to one another. That is, in effect, alternating refreshes are polarized substantially perpendicular to one another.

Thus, the embodiment of the invention shown in FIG. 6 works as follows. In one case, polarized plate 46 is polarized vertically, and liquid crystal panel 48 twists the light ninety degrees in even-numbered refreshes. Thus, odd-numbered refreshes of the display device are polarized vertically. They are not twisted by panel 48. Conversely, even-numbered refreshes are polarized horizontally, because they are twisted ninety degrees by panel 48. Since the left-eye component of an image is shown only in odd-numbered refreshes and the right-eye component is shown only in even-numbered refreshes, the user of the computer will view the image in apparent three dimensions using viewing glasses having a left lens vertically polarized and a right lens horizontally polarized.

Unlike the display device shown in FIG. 5, the display system shown in FIG. 6 in one embodiment requires an external controller to signal to the polarizing element when a new refresh has begun. That is, the polarizing element of FIG. 5 twists alternating refreshes of the display device ninety degrees. Because it is a part of the display device itself, it knows when a new refresh has begun, and can twist it accordingly. However, the polarizing element of FIG. 6 is not necessarily part of the display device, but in one embodiment is part of an add-on device. Therefore, a controller operatively coupled to the display device is included to signal the refreshing of the display device.

Figure 7:
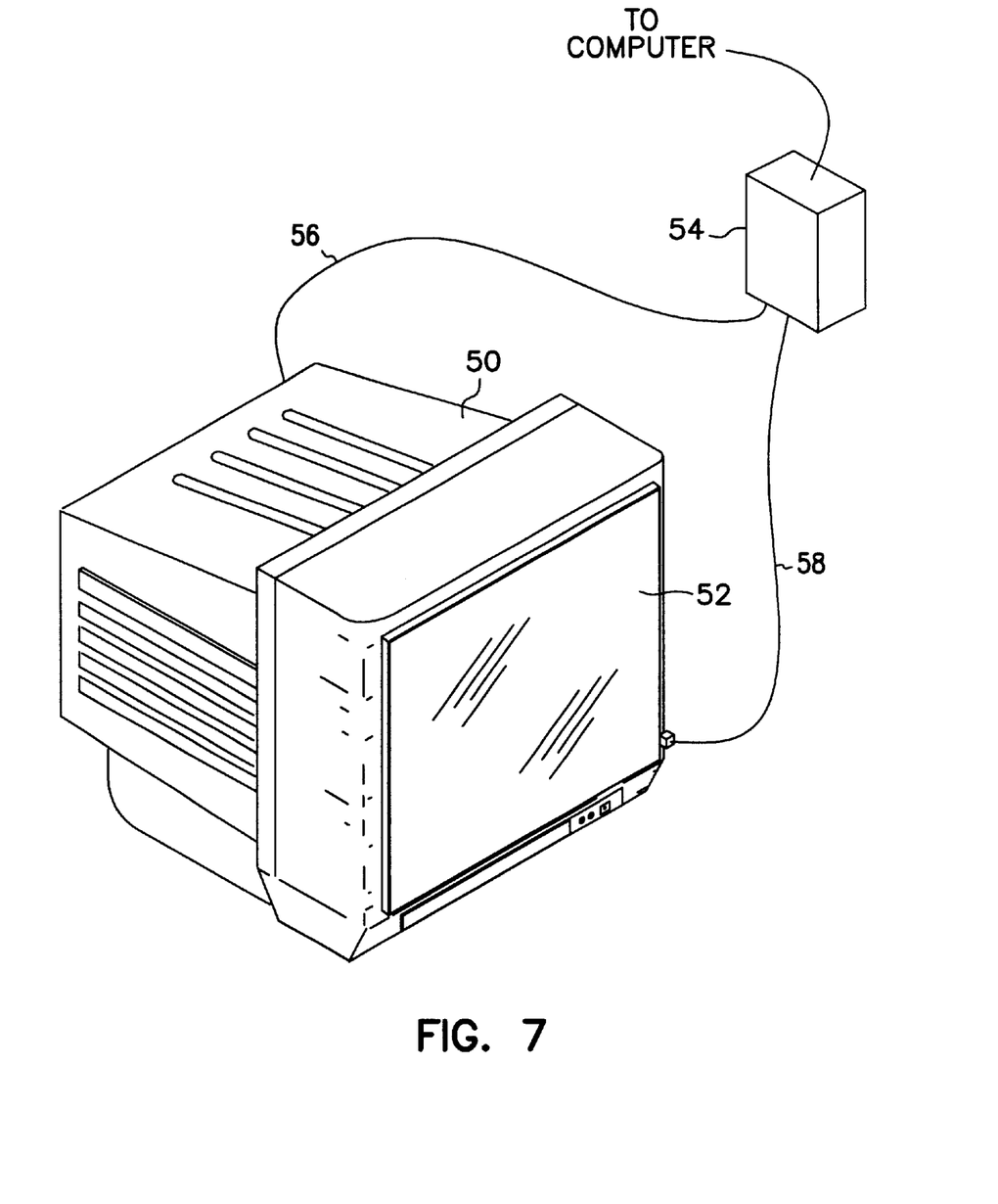

This is shown in FIG. 7, which is a diagram showing an embodiment of the present invention utilizing an add-on device in conjunction with a typical display device of a computer. Display device 50 has a screen and corresponds to display device 44 of FIG. 6, and has removably mounted thereto add-on device 52, which includes polarized plate 46 and liquid crystal panel 48. Add-on device 52, as shown, includes a mounting component such as a bracket so that polarized plate 46 and liquid crystal panel 48 remain in position over the screen of the display device. The present invention is not limited to any particular mounting component, and any such component can be utilized without departing from the spirit or scope of the present invention.

Controller 54 as shown is coupled by a cable to both add-on device 52 and display device 50. Controller 54 receives the video signal output of a computer (not shown), passes through the video signal to display device 50 via cable 56, and provides a control signal to add-on device 52 via cable 58 to signal the refreshing of the display device. The present invention is not limited to any particular control signal being provided by controller 54. However, in one embodiment, controller 54 monitors the vertical sync of the display device so that it can signal the refreshing of the display device to add-on device 52.

Those of ordinary skill in the art will readily appreciate that many changes and modifications to the above drawings and description can be made without departure from the spirit or scope of the following claims. For example, the invention as shown in several of the drawings has been shown to apply to a desktop computer. However, modification of the present invention to apply to a laptop computer is also within the scope of the following claims.

I claim:

1. A system for viewing a three-dimensional image generated by a computer, the image separated into first eye and second eye components, the system comprising:
   a computer-driven display device comprising:
      a light source,
      a first polarized plate positioned over the light source,
      a first liquid crystal panel positioned over the first polarized plate to twist light emanating from the light source through the first polarized plate from zero-to ninety degrees,
      a second polarized plate positioned over the first liquid crystal panel, and
      a polarizing element positioned over the second polarized plate to twist the light twisted by the first liquid crystal panel and polarized by the second polarized plate;
   said display device adapted to display the first eye and second eye components in alternating refreshes of the display device, the alternating refreshes polarized substantially perpendicular to one another; and,
   a pair of viewing glasses having two lenses, each lens polarized substantially perpendicular to one another in accordance with a polarization from the display during the alternating refreshes.

2. The system of claim 1, wherein the first eye component is a left-eye component and the second eye component is a right-eye component.

3. The system of claim 1, wherein the system further comprises a graphics card with dual frame buffers to drive the computer-driven display device.

4. The system of claim 1, further comprising a computer operatively coupled to the computer-driven display device, said computer operative to separate the three-dimensional image into first eye and second eye components.

5. A display device for a computer comprising:
   a light source;
   a first polarized plate positioned over the light source;
   a first liquid crystal panel positioned over the first polarized plate to twist light emanating from the light source through the first polarized plate from zero to ninety degrees;
   a second polarized plate positioned over the first liquid crystal panel; and,
   a polarizing element positioned over the second polarized plate to twist the light twisted by the first liquid crystal panel and polarized by the second polarized plate substantially ninety degrees in alternating refreshes of the display device.

6. The display device of claim 4, wherein the second polarized plate is polarized substantially perpendicular to the first polarized plate.

7. The display device of claim 4, wherein the polarizing element is a second liquid crystal panel.

* * * * *

UNITED STATES PATENT AND TRADEMARK OFFICE
CERTIFICATE OF CORRECTION

PATENT NO. : 6,252,570 B1  
DATED : June 26, 2001  
INVENTOR(S) : Mark M. Mangerson It is certified that error appears in the above-identified patent and that said Letters Patent is hereby corrected as shown below:

<u>Title page, Item [54] and Column 1, line 1,</u>
Title, "POLARIZED THREE-DEMENSIONAL VIDEO DISPLAY" should read -- POLARIZED THREE-DIMENSIONAL VIDEO DISPLAY --.

<u>Title page,</u>
Item [57], ABSTRACT,
"particular" should read -- perpendicular --.

Signed and Sealed this

Sixteenth Day of July, 2002

Attest:

JAMES E. ROGAN
*Attesting Officer*  *Director of the United States Patent and Trademark Office*